US012512624B2

(12) United States Patent
Shiue et al.

(10) Patent No.: US 12,512,624 B2
(45) Date of Patent: Dec. 30, 2025

(54) ELECTRICAL CONNECTOR WITH MODIFIED SIZE AND SHAPE OF METAL SHELL OPENING FOR IMPEDANCE MATCHING

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventors: Li-Chun Shiue, New Taipei (TW); Jian-Ren Wang, New Taipei (TW); Kai-Chieh Yang, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 309 days.

(21) Appl. No.: 18/207,393

(22) Filed: Jun. 8, 2023

(65) Prior Publication Data

US 2023/0402795 A1 Dec. 14, 2023

(30) Foreign Application Priority Data

Jun. 9, 2022 (CN) ......................... 202221432150.6

(51) Int. Cl.

*H01R 13/6471* (2011.01)
*H01R 12/71* (2011.01)
(Continued)

(52) U.S. Cl.

CPC ....... *H01R 13/6471* (2013.01); *H01R 12/716* (2013.01); *H01R 13/516* (2013.01);
(Continued)

(58) Field of Classification Search

CPC .............. H01R 13/6471; H01R 12/716; H01R 13/516; H01R 13/6474; H01R 13/6581;
(Continued)

(56) References Cited

U.S. PATENT DOCUMENTS 9,425,526 B2 8/2016 Murata
9,450,340 B2 9/2016 Murata
11,108,173 B2 * 8/2021 Okada .................. H01R 9/0518

FOREIGN PATENT DOCUMENTS

WO 2022004398 A1 1/2022
WO WO-2023058696 A1 * 4/2023 ............. H01R 24/38

* cited by examiner

*Primary Examiner* — Justin M Kratt
(74) *Attorney, Agent, or Firm* — Ming Chieh Chang

(57) ABSTRACT

An electrical connector includes: an insulating body; plural conductive terminals disposed in the insulating body, the conductive terminals including two signal terminals and one ground terminal arranged between the two signal terminals; a cable connected with the conductive terminals; and a metal shell disposed outside the insulating body, the metal shell including a top wall, an opening being set on the top wall, the shape of the opening being rectangular, the top wall being provided with elastic pieces protruding inward from the opening to electrically connect with the ground terminal, wherein the opening is sized and configured to achieve better electrical performance of the conductive terminals.

9 Claims, 12 Drawing Sheets

(51) Int. Cl.

| | |
|---|---|
| ***H01R 13/516*** | (2006.01) |
| ***H01R 13/6474*** | (2011.01) |
| ***H01R 13/6581*** | (2011.01) |
| *H01R 12/75* | (2011.01) |
| *H01R 13/646* | (2011.01) |
| *H01R 13/6461* | (2011.01) |
| *H01R 13/648* | (2006.01) |
| *H01R 13/658* | (2011.01) |

(52) U.S. Cl.
CPC ..... *H01R 13/6474* (2013.01); *H01R 13/6581* (2013.01); *H01R 12/71* (2013.01); *H01R 12/712* (2013.01); *H01R 12/714* (2013.01); *H01R 12/75* (2013.01); *H01R 13/646* (2013.01); *H01R 13/6461* (2013.01); *H01R 13/648* (2013.01); *H01R 13/658* (2013.01)

(58) Field of Classification Search
CPC .... H01R 12/71; H01R 12/712; H01R 12/714; H01R 12/75; H01R 13/646; H01R 13/6461; H01R 13/648; H01R 13/658
See application file for complete search history.

ELECTRICAL CONNECTOR WITH MODIFIED SIZE AND SHAPE OF METAL SHELL OPENING FOR IMPEDANCE MATCHING

BACKGROUND OF THE INVENTION

Field of the Invention

The present invention relates to an electrical connector with high-frequency transmission performance.

Description of Related Arts

In high-speed design of the connector, the problem of impedance matching is often encountered. Impedance matching is a working state in which the load impedance and the internal impedance of the excitation source are adapted to each other to obtain the maximum power output. In layman's terms, the purpose of impedance matching is to ensure that the signal or energy can be effectively transmitted from the signal source to the load. The matching of high-frequency impedance is related to the quality of the signal. If the impedance does not match, reflection will be formed, the energy will not be transmitted, and a standing wave will be formed on the transmission line, resulting in a decrease in the effective power capacity of the transmission line, resulting in poor electrical performance, affecting the transmission stability of each signal in the electrical connector. Therefore, there is a need for an improved electrical connector, which has high-frequency impedance matching and stable signal transmission.

SUMMARY OF THE INVENTION

A main object of the present invention is to provide an improved electrical connector with better high-frequency transmission performance.

To achieve the above-mentioned object, an electrical connector comprises: an insulating body; a plurality of conductive terminals disposed in the insulating body, the plurality of conductive terminals including two signal terminals and one ground terminal arranged between the two signal terminals, each of the two signal terminals and the ground terminal including a contact portion, a middle portion extending from the contact portion, a vertical portion perpendicular to the middle portion, and a straight portion perpendicular to the vertical portion, the signal terminal further including a base part and a transition portion between the straight portion and the base part, the contact portion being U-shaped and including a first bending portion and a second bending portion; a cable connected with the plurality of conductive terminals; and a metal shell disposed outside the insulating body, the metal shell including an annular portion with a receiving space, the annular portion including a top wall, the top wall having an opening with two opposite widthwise sides and two opposite lengthwise sides and two dug holes communicating with the opening, the conductive terminals being partially and directly below the opening and the dug holes and spaced apart from the opening and dug holes in an up-down direction, the top wall further being provided with elastic pieces protruding inward from the opening to electrically connect with the ground terminal, wherein the width of the straight portion of the signal terminal is defined as L, one end of the widthwise side of the opening is set between L/2 outside the straight portion of one signal terminal and L/2 inside the straight portion of the one signal terminal while the other end of the widthwise side of the opening is set between L/2 outside the the straight portion of the other signal terminal and L/2 inside the straight portion of the other signal terminal, and one end of the lengthwise side of the opening is set between the first bending portion and the second bending portion while the other end of the lengthwise side of the opening is set between a connection point of the straight portion and the transition portion and a widest point of the base part.

In the present invention, by setting the size and shape of the opening on the top wall of the metal shell, the high-frequency impedance matching can be adjusted, so that the product has better electrical functions and ensures stable signal transmission.

DETAILED DESCRIPTION OF THE DRAWINGS

Figure 1:
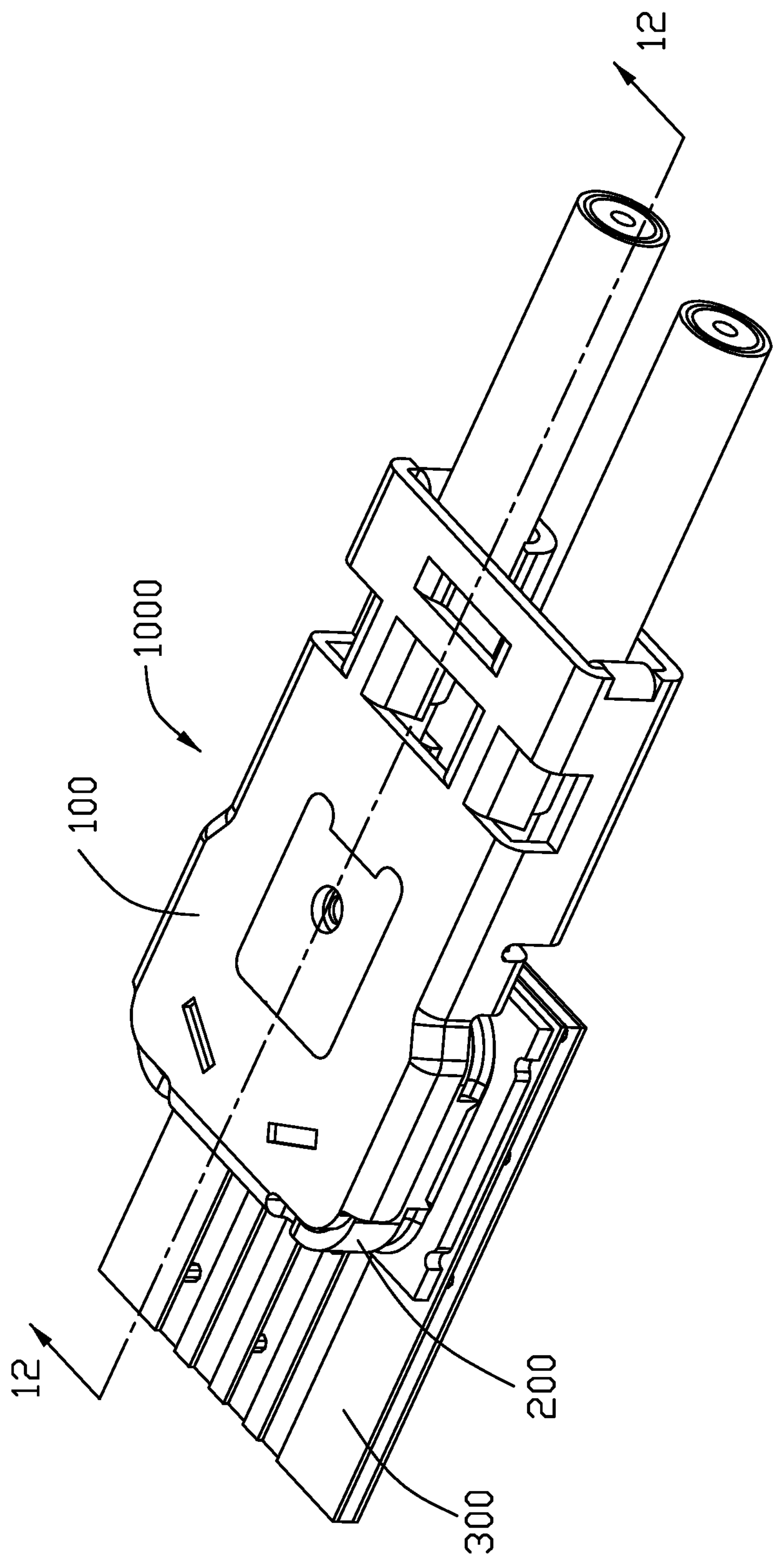
FIG. 1 is a perspective view of an electrical connector assembly.
Figure 2:
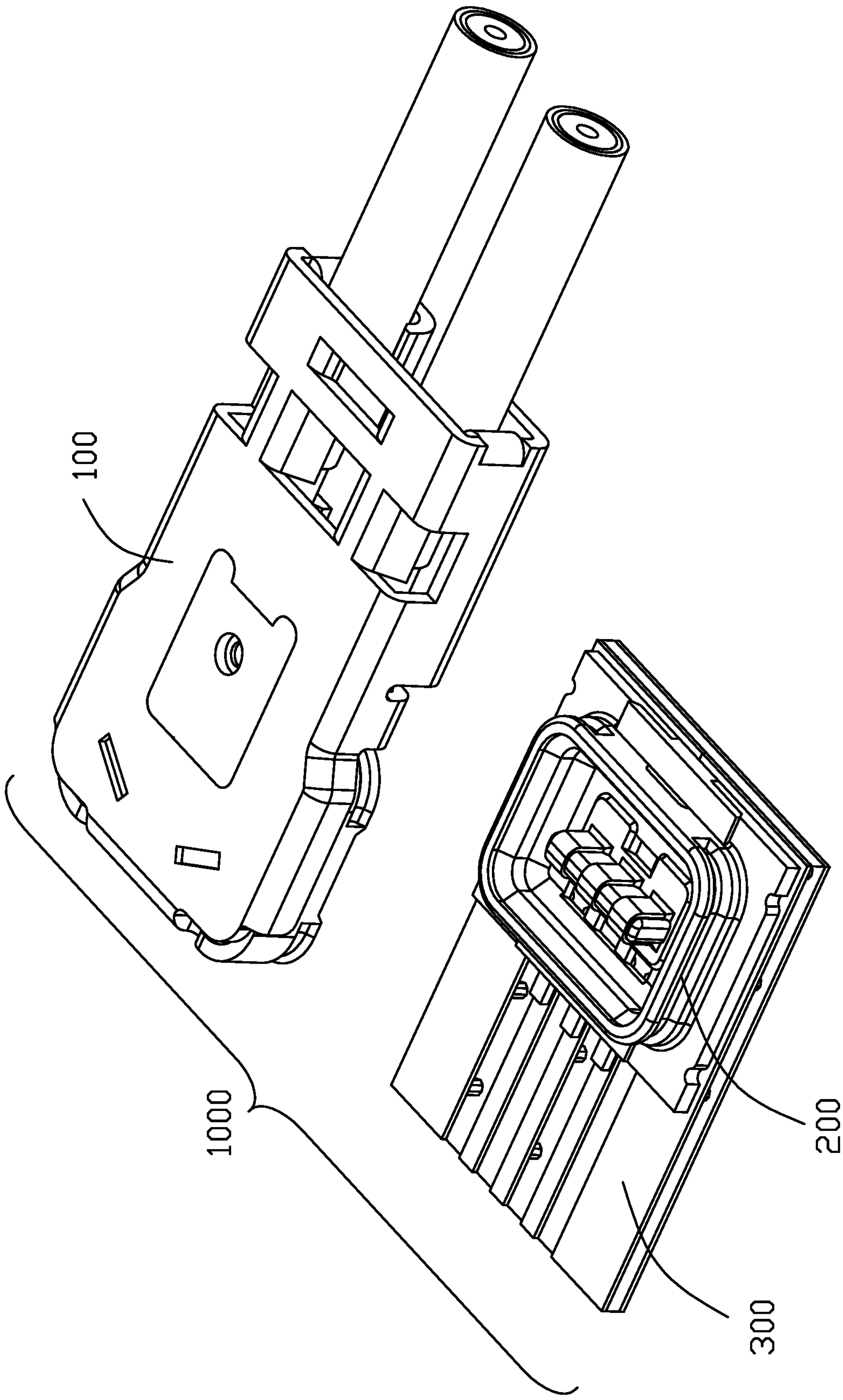
FIG. 2 is a perspective view of the electrical connector assembly, wherein a first connector and a second connector are in an unmated state, and the second connector is connected to the circuit board.
Figure 3:
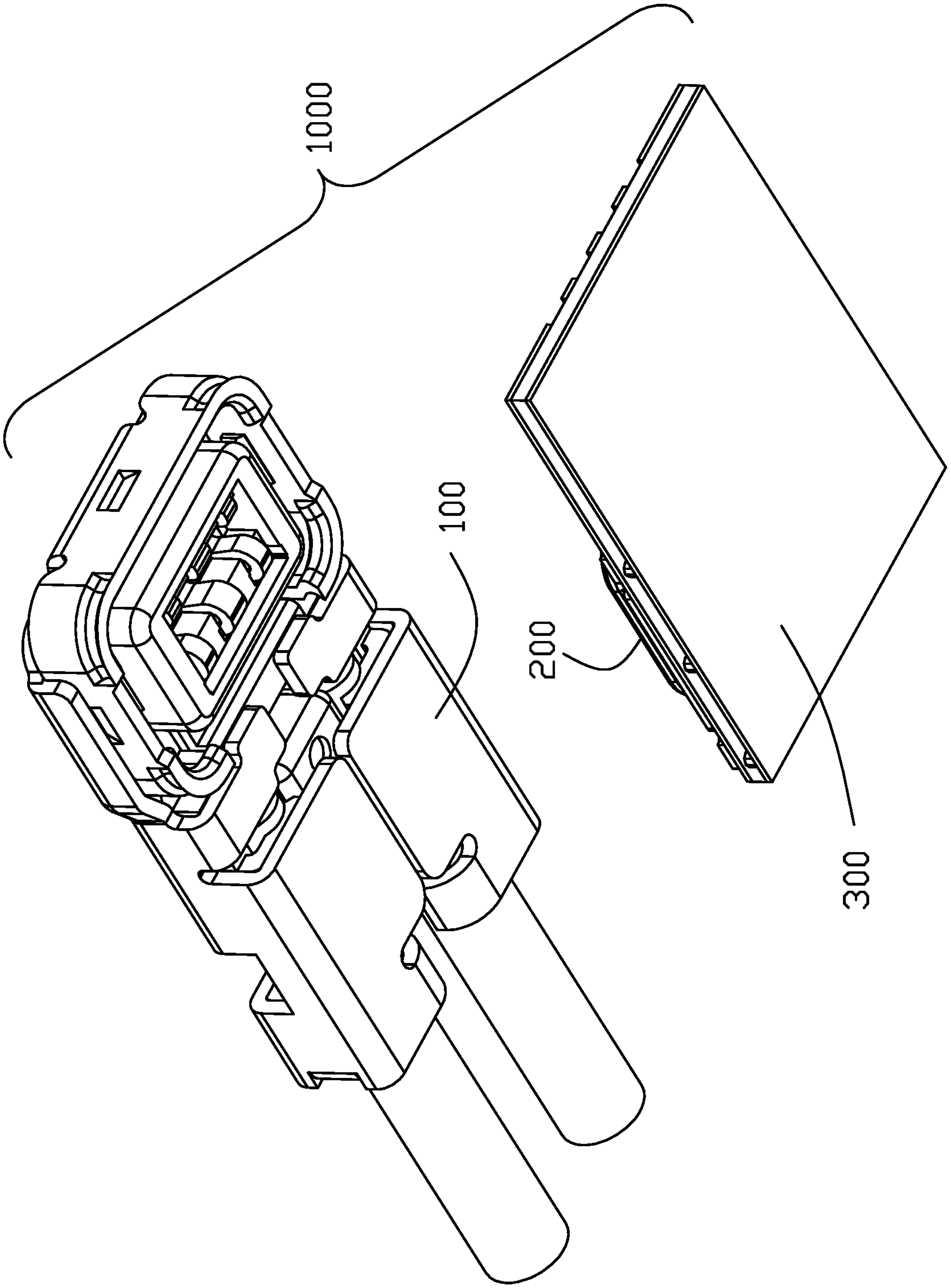
FIG. 3 is another perspective view of the electrical connector assembly shown in FIG. 2.
Figure 4:
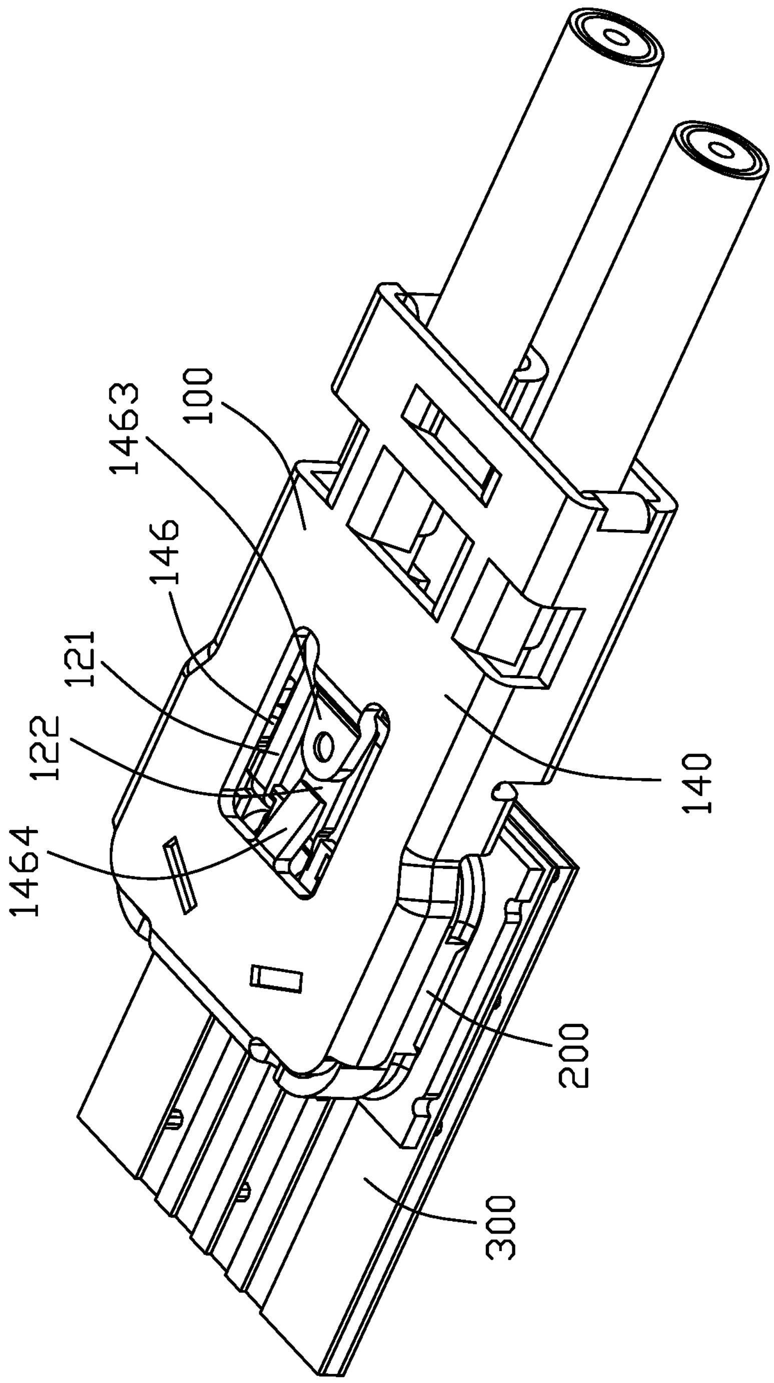
FIG. 4 is a perspective view of the electrical connector assembly shown in FIG. 1, wherein the second holder is removed.
Figure 5:
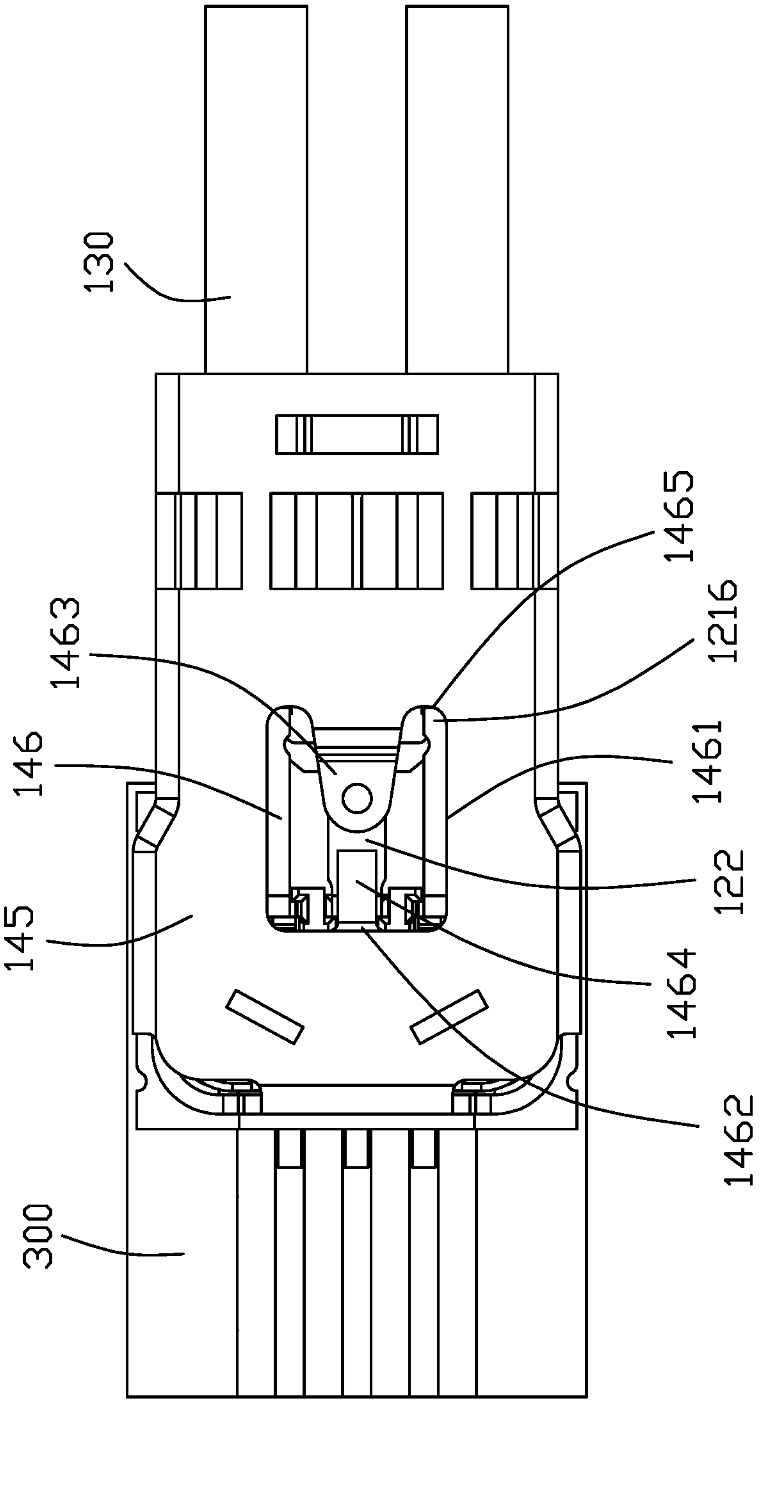
FIG. 5 is a top view of the electrical connector assembly shown in FIG. 4.
Figure 6:
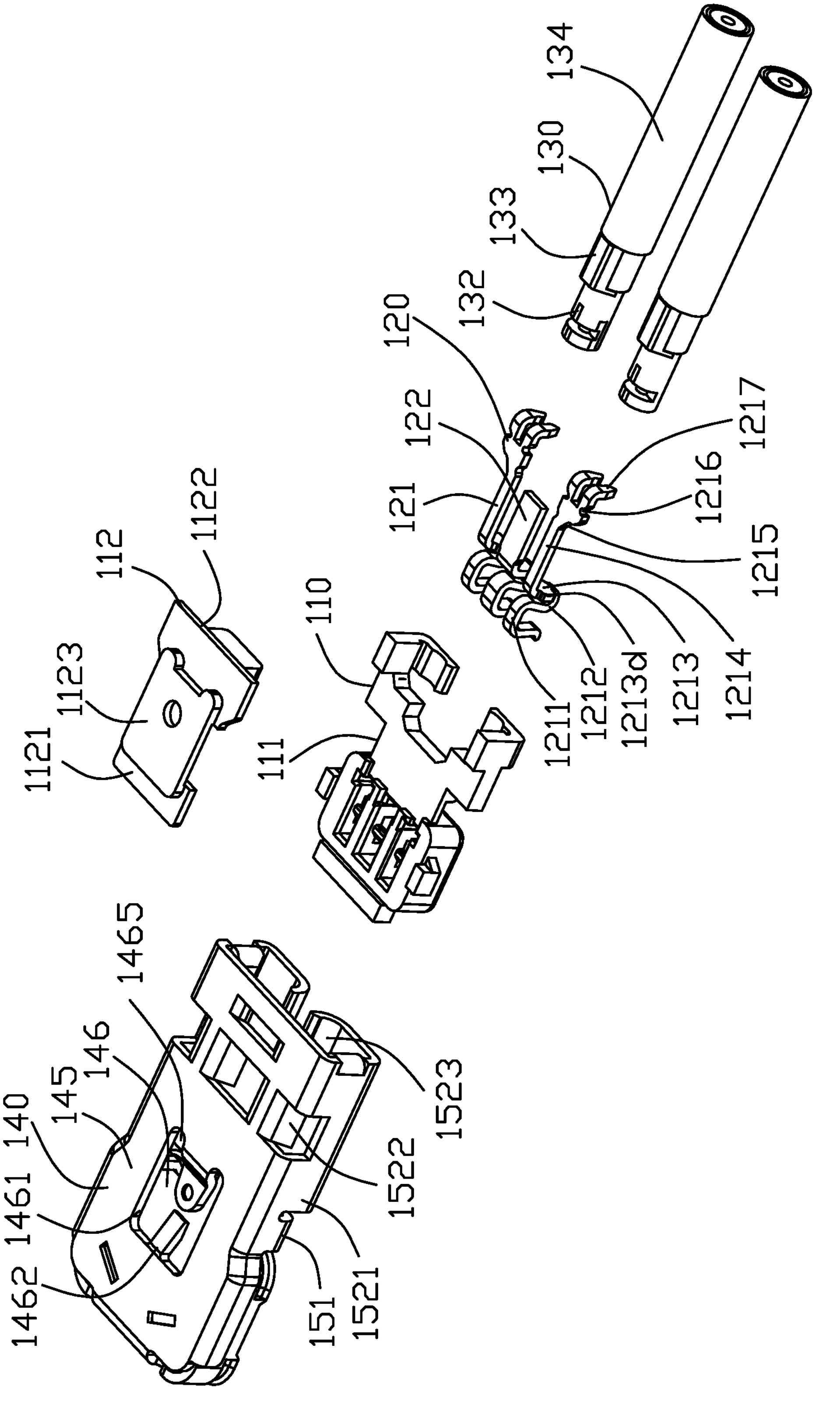
FIG. 6 is an exploded view of the first connector of the electrical connector assembly.
Figure 7:
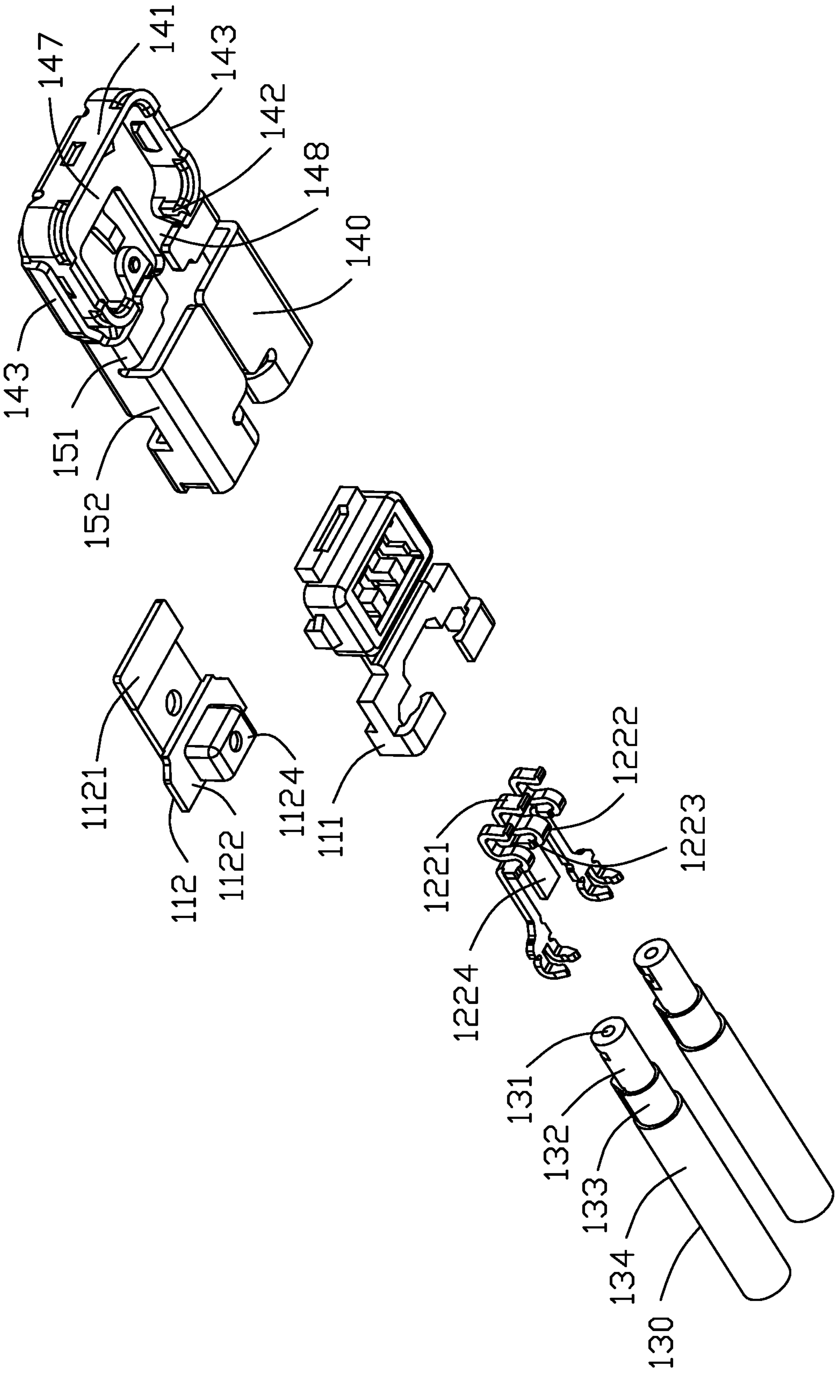
FIG. 7 is another exploded view of the first connector.
Figure 8:
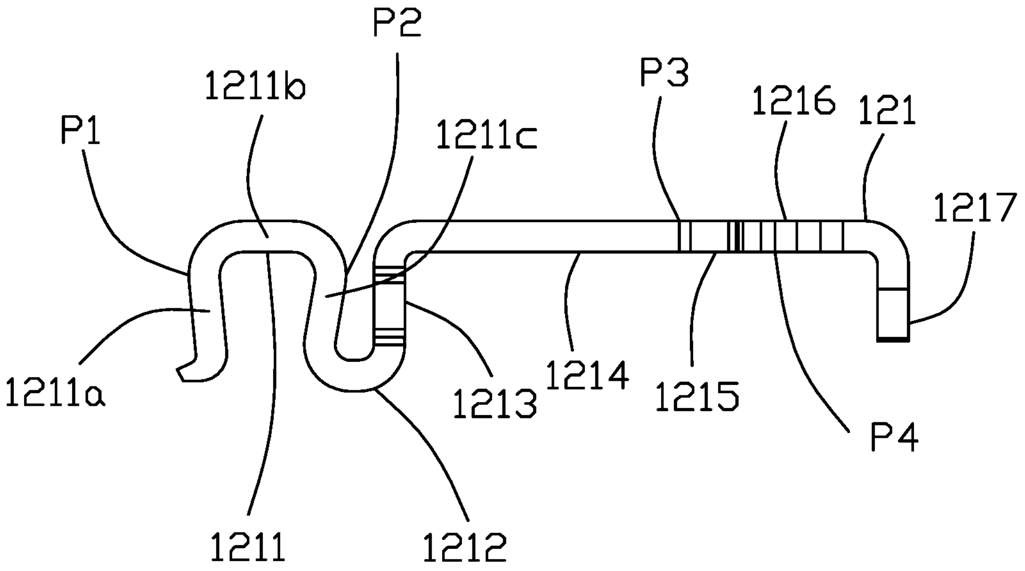
FIG. 8 is a side view of a signal terminal of the first connector shown in FIG. 6.
Figure 9:
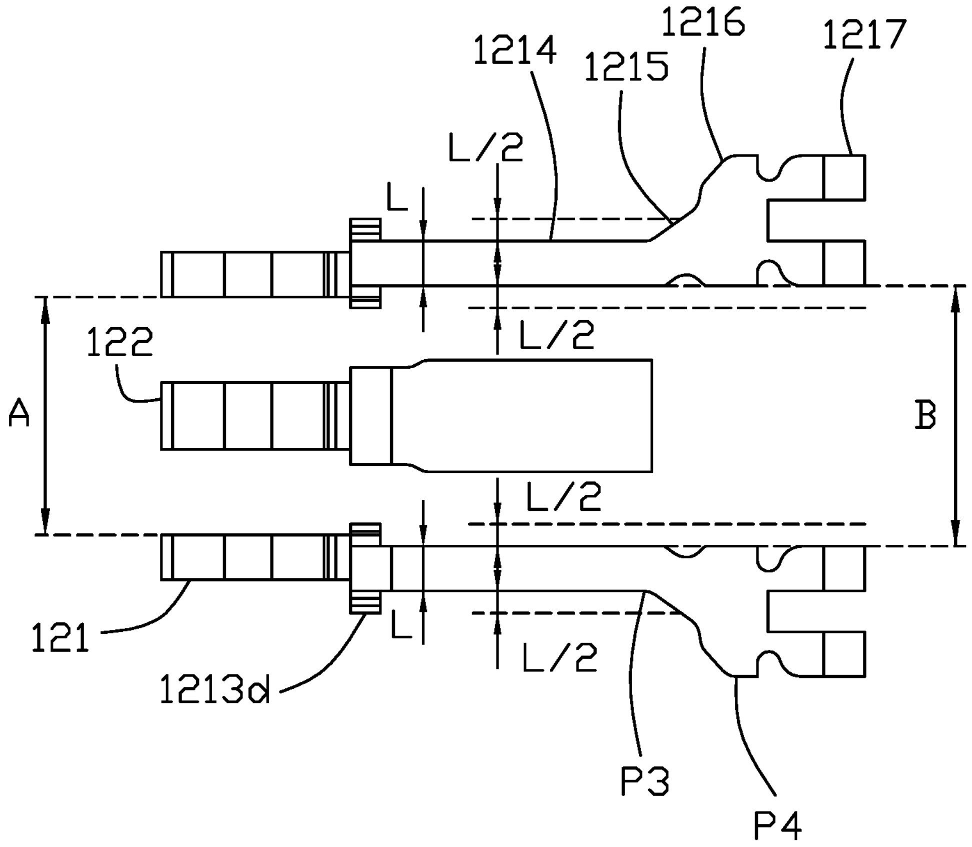
FIG. 9 is a top view of the conductive terminals of the first connector shown in FIG. 6.

Referring to FIGS. 1-12, an electrical connector assembly 1000 includes a first connector 100, a second connector 200 connected with the first connector 100, and a circuit board 300 connected with the second connector 200.

The first connector 100 includes an insulating body 110, a plurality of conductive terminals 120 disposed in the insulating body 110, a cable 130 connected to the conductive terminal 120, and a metal shell 140 disposed outside the insulating body 110. The metal shell 140 is formed by stamping, bending, cutting and other processing of metal plates, and it includes a front wall 141, a rear wall 142, two side walls 143 and a top wall 145. The front wall 141, the rear wall 142, the two side walls 143 and the top wall 145 surround and form an annular portion 147 with a receiving space, and the insulating body 110 is partially held in the annular portion 147. An opening 146 is set at the center of the top wall. The conductive terminals 120 include two signal terminals 121 and one ground terminal 122, the ground terminal 122 disposed between the two signal terminals 121 and arranged side by side with the signal terminals 121. It should be noted that the width of the ground terminal 122 is greater than that of the signal terminal 121. The signal terminal 121 includes a substantially U-shaped contact portion 1211 connected to the mating terminal, a middle portion 1212 extending from the contact portion 1211 toward the cable 130, a vertical portion 1213 perpendicular to the middle portion 1212, a straight portion 1214 perpendicular to the vertical portion 1213 and extending toward the cable 130, a base part 1216 extending from the straight portion 1214 toward the cable 130, a transition portion 1215 connecting the straight portion 1214 and the base part 1216 and a connection portion 1217 electrically connected to the inner conductor 131 of the cable 130. The contact portion 1211 further includes a first division part 1211*a* away from the direction of the cable, a second division part 1211*b* perpendicular to the first division part 1211*a* and extending toward the cable 130, and a third division part 1211*c* connecting the second division part 1211*b* and the middle portion 1212. The first division part 1211*a* is connected to the second division part 1211*b* to form a first bending portion P1, and the second division part 1211*b* is connected to the third division part 1211*c* to form a second bending portion P2. The ground terminal includes a substantially U-shaped contact portion 1221, a middle portion 1222 extending from the contact portion 1221 toward cable 130, a vertical portion 1223 perpendicular to the middle portion 1222, and a straight portion 1224 perpendicular to the vertical portion 1223 and extending toward the cable 130.

From contact portion 1211 to connecting portion 1217, the distance between the two signal terminals 121 is not the same. Specifically, the vertical portion 1213 includes a widened portion 1213*d*. The distance between the two signal terminals from the contact portion 1211 to the side of the widened portion 1213*d* close to the middle portion 1212 is A, the distance between the two signal terminals from the side of the widened portion 1213*d* close to the straight portion 1214 to the connecting portion 1217 is B, and B>A. It can be known that improving the isolation can reduce the interference problem between radio frequency signals, and the distance is one of the factors that affect the isolation. Therefore, increasing the distance between the signals is an effective way to improve the isolation.

Referring to FIGS. 6-9, preferably, the shape of the opening 146 is rounded rectangular. The side of the opening 146 parallel to the extending direction of the conductive terminal 120 is the lengthwise side 1461, the side perpendicular to the extending direction of the conductive terminal 120 is the broad side 1462. The conductive terminals 120 are partially and directly below the opening 146 and spaced apart from the opening 146 in an up-down direction. Specifically, the width of the straight portion 1214 of the signal terminal 121 is defined as L. When viewed in a direction perpendicular to the top wall 145, one end of the widthwise side 1462 of the opening 146 is set between at L/2 outside the side close to the ground terminal 122 of the straight portion 1214 of the signal terminal and at L/2 outside the side away from the ground terminal 122 of the straight portion 1214 of the same signal terminal, the other end of the widthwise side 1462 of the opening 146 is set between at L/2 outside the side close to the ground terminal 122 of the straight portion 1214 of the other signal terminal and at L/2 outside the side away from the ground terminal 122 of the straight portion 1214 of the other same signal terminal; one end of the lengthwise side 1461 of the opening 146 is set between the first bending portion P1 and the second bending portion P2, the other end of the lengthwise side 1461 of the opening 146 is set between the connection point P3 which connecting the straight portion 1214 and the transition portion 1215 and the widest point P4 of the base part 1216. Preferably, the widthwise side 1462 is arranged axially symmetrically with respect to the center line of the ground terminal 122. In this embodiment, the widthwise side 1462 is from the side away from the ground terminal of the straight portion 1214 of the signal terminal 121 to the side away from the ground terminal of the straight portion 1214 of the other signal terminal 121. The lengthwise side 1461 is from the second bending portion P2 to the widest point P4 of the base part 1216. Elastic pieces 1463 and 1464 are respectively set on the two widthwise sides 1462. The elastic pieces 1463, 1464 protrude into the opening 146 and contact the straight portion 1224 of the ground terminal 122. The top wall 145 is further provided with two dug holes 1465 communicating with the opening 146 on the side of the opening 146 close to the direction of the cable 130, the two dug holes 1465 are respectively set on both sides of the elastic piece 1463. In a direction perpendicular to the top wall 145, the dug holes 1465 partially overlap the corresponding base part 1216 of the signal terminal 121.

The insulating body 110 includes a first holder 111 and a second holder 112 stacked up and down, the conductive terminals 120 are disposed between the first holder 111 and the second holder 112, and the second holder 112 is disposed between the top wall 145 and the conductive terminal 120. The second holder 112 includes two first portions 1121, 1122 with the same height, a second portion 1123 disposed above the two first portions 1121, 1122 and connecting the two first portions 1121, 1122, and a protrusion portion 1124 disposed under the first portion 1122. The second portion 1123 partially overlaps the first portions 1121 and 1122 in the up-down direction. The second portion 1123 fills the opening 146 and shaped to conform to the shape of the opening 146. The elastic pieces 1463, 1464 extend through the second portion 1123 and electrically connected to the ground terminal 122. The signal terminals 121 are disposed between the second holder 112 and the top wall 145 in a state of being insulated from the metal shell 140. The rear wall 142 includes a gap 148, the conductive terminal 120, the first holder 111 and the second holder 112 extend out through the gap 148. The metal shell 140 further includes a first clamping portion 151 and a second clamping portion 152 extending from the two side walls 143 toward the direction of the cable in sequence. The cable 130 includes an inner conductor 131, an inner insulating layer 132, an outer conductor 133 and an outer insulating layer 134 arranged sequentially from inside to outside. The first clamping portion 151 clamps part of the first holder 111 and the second holder 112. The second clamping portion 152 further includes a first claw portion 1521 holding parts of the first holding part 111 and the second holding part 112 and the inner insulator 132 of the cable 130, a second claw portion 1522 for holding the outer conductor 133 and a third claw 1523 holding the outer insulating layer 134.

There are different characteristic impedance values for different signal systems, such as 75 ohm, 100 ohm, 90 ohm, 50 ohm, etc. For high frequency radio frequency signals, the most common impedance control is 50 ohm. The purpose of impedance matching is to ensure the effective transmission of signal or energy from signal source to load. In order to achieve the best RF performance, in practice, it is necessary to adjust the impedance matching circuit by adjusting the capacitance and inductance. The size and shape of the opening 146 are designed so that the capacitance between the metal shell 140 and the conductive terminal 120 can be increased or decreased, therefore, the characteristic impedance matching of the conductive terminal 120 can be adjusted. Therefore, according to the first connector 100, it becomes easy to set the characteristic impedance of the conductive terminal 120 to a predetermined characteristic impedance of 50 ohm. Therefore, according to the first connector 100, it becomes easy to set the characteristic impedance of the conductive terminal 120 to a predetermined characteristic impedance of 50 ohm.

Figure 10:
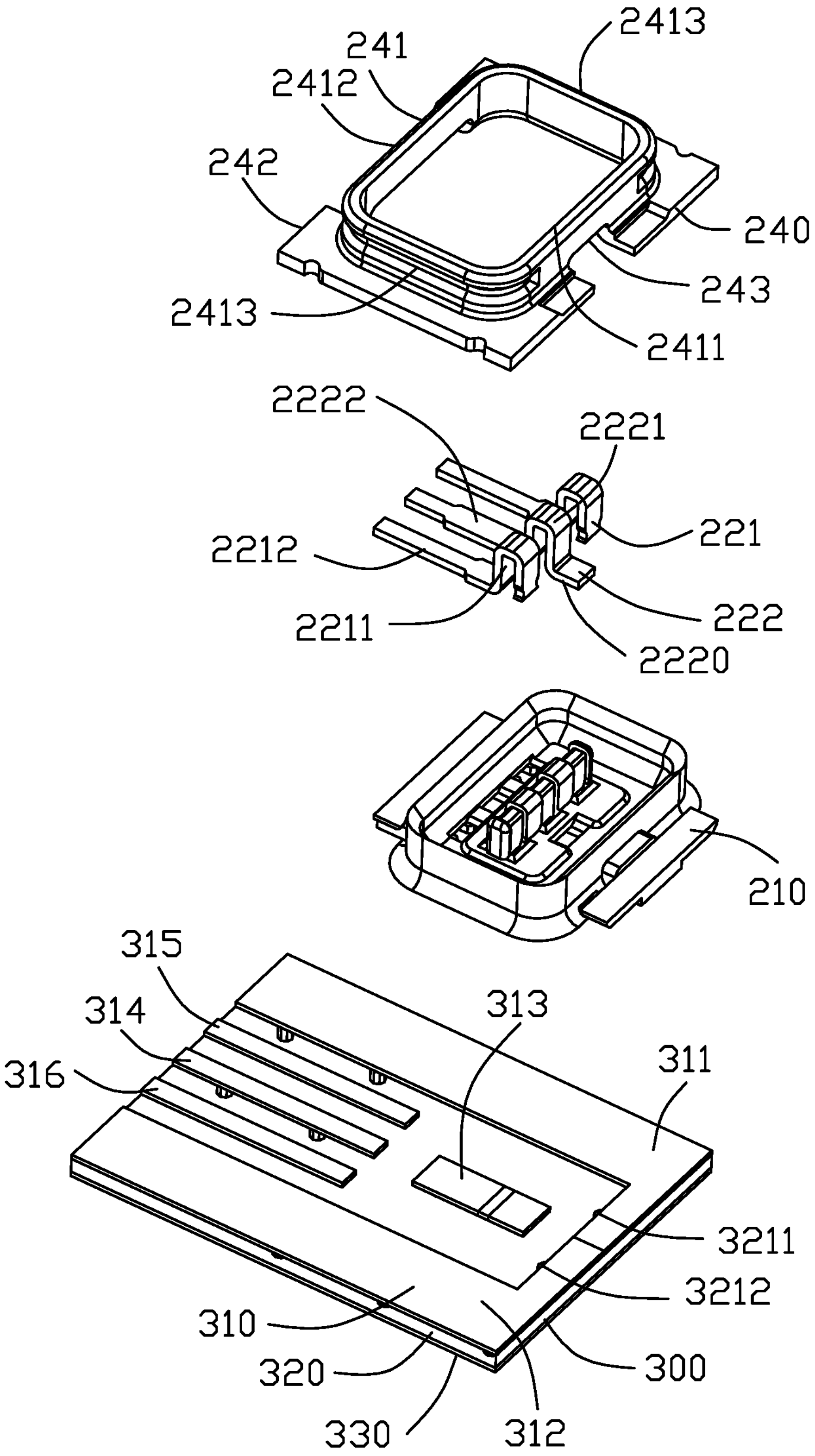
FIG. 10 is an exploded view of the second connector and circuit board shown in FIG. 2.
Figure 11:
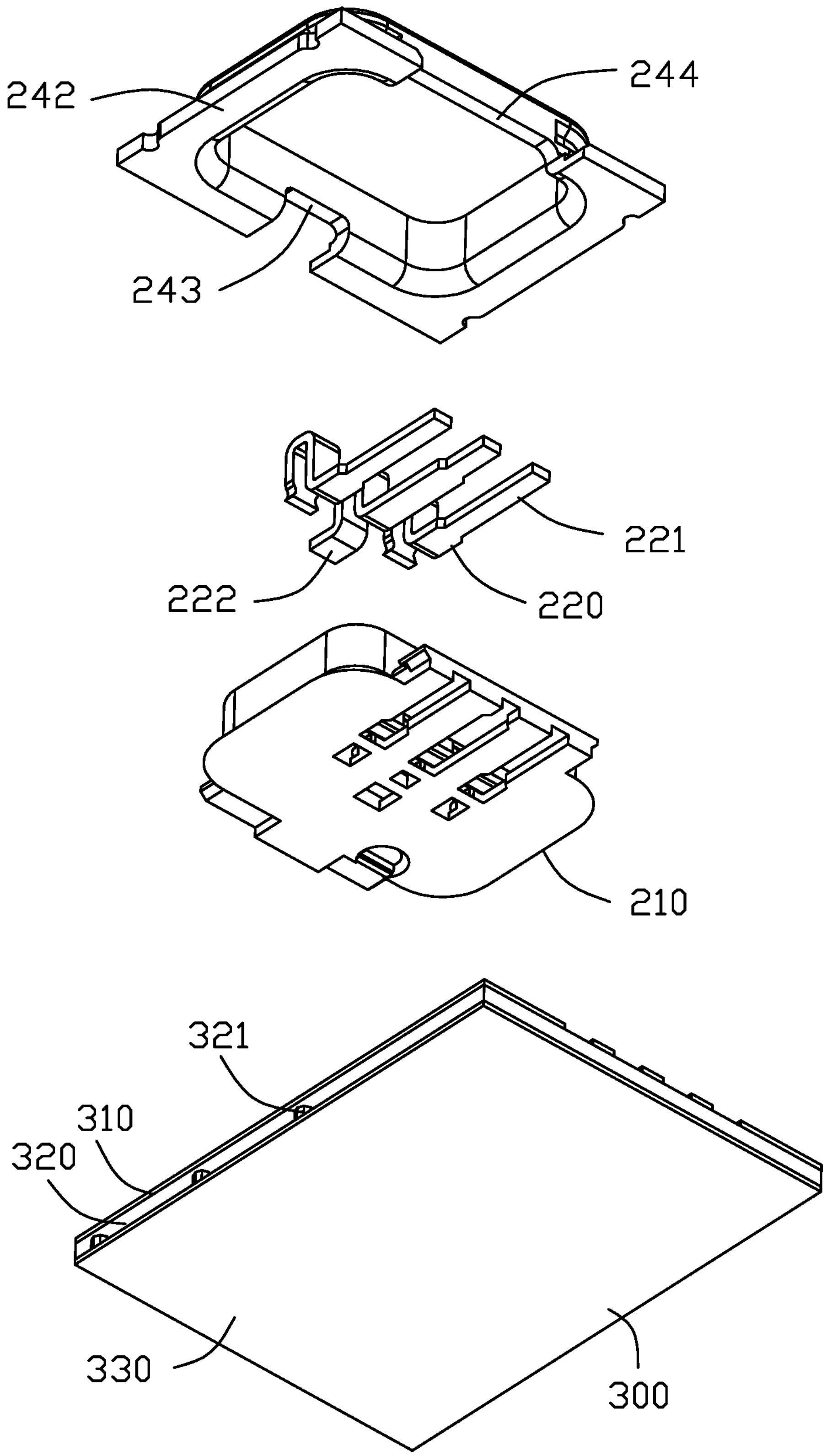
FIG. 11 is another view of the second connector and circuit board shown in FIG. 10.

Referring to FIGS. 10 and 11, the second connector 200 includes an second insulating body 210, a plurality of second conductive terminals 220 disposed in the second insulating body 210 and a second metal shell 240 disposed outside the second insulating body 210. The second conductive terminals 220 include two second signal terminals 221 and a second ground terminal 222 disposed between the second signal terminals 221. The second metal shell 240 includes a substantially rectangular second annular portion 241, the second annular portion 241 includes a front wall 2411, a rear wall 2412 and two side walls 2413. The second metal shell 240 also includes an extension portion 242 extending from the bottom of the front wall 2411, the rear wall 2412 and the two side walls 2413 to the surroundings. A first notch 243 is set at the lower part of the front wall 2411, the first notch 243 is located approximately at the lower part of the middle position of the front wall. A second notch 244 is set at the lower part of the rear wall 2412. The number of the first notch 243 can be one or two, and the size of the first notch 243 is smaller than that of the second notch 244. The second insulating body 210 holds two second signal terminals 221 and one second ground terminal 222, and the second insulating body 210 may be insert-molded to form an integral body with the second metal shell 240.

Figure 12:
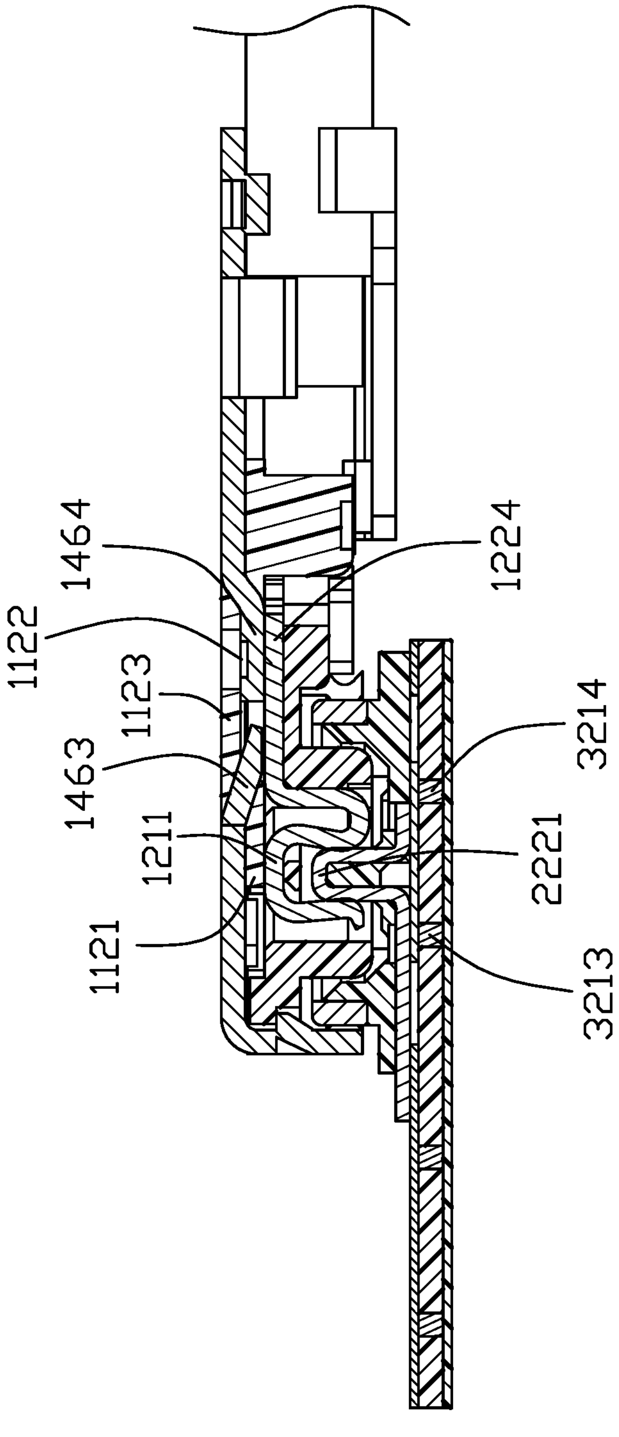
FIG. 12 is a sectional view of the electrical connector assembly shown in FIG. 1 along line 12-12.

Referring to FIGS. 10-12, the second signal terminal 221 includes a U-shaped second contact portion 2211 and a second straight portion 2212, the second contact portion 2211 is connected to the contact portion 1211 of the signal terminal 121 of the first connector 100. The second ground terminal 222 includes a front portion 2220 close to the front wall 2411, a U-shaped contact portion 2221 connecting with the contact portion 1221 of the ground terminal 222, and a straight portion 2222. The second straight portion 2212 of signal terminal 221 and the straight portion 2222 of ground terminal 222 extend out the second metal shell 240 through the second notch 244. When the first connector 100 mating with the second connector 200, the contact portion 1221 of the signal terminals 121 are connected with the second contact portion 2221 of the second signal terminals 221, the contact portion 1221 of the ground terminal 122 is connected with the contact portion 2221 of the second ground terminal 222. The metal shell 140 and the second metal shell 240 are mated with each other, and the conductive terminals 120 and the second conductive terminals 220 are shielded all around to improve noise immunity.

The second connector 200 is electrically connected to the circuit board 300. Specifically, the circuit board 300 includes a first copper layer 310, an insulating layer 320 attached to the first copper layer 310, and a second copper layer 330 attached to the insulating layer 320. The first copper plating layer 310 further includes first conductive sheets 311, 312 electrically connected to the second metal shell 240, second conductive sheets 313, 314 connected to the second ground terminal 222, and third conductive sheets 315, 316 connected to the signal terminal 221. A plurality of plating holes 321 are uniformly spaced apart set on the insulating layer 320, the first conductive sheets 311, 312 and the second conductive sheets 313, 314 are electrically connected with the second copper layer 330 through the plating holes 321. Two first plating holes 3211, 3212 are respectively provided below the first conductive sheets 311, 312 and near the sides of first notch 243, and two second plating holes 3213, 3214 are provided below the second conductive sheets 313. Therefore, the grounding routes of the circuit board 300 are connected up and down through the first plating holes 3211, 3212, the second plating holes 3213, 3214 and other plating holes to obtain a better grounding performance.

The invention claimed is:

1. An electrical connector comprising:

an insulating body;

a plurality of conductive terminals disposed in the insulating body, the plurality of conductive terminals including two signal terminals and one ground terminal arranged between the two signal terminals, each of the two signal terminals and the ground terminal including a contact portion, a middle portion extending from the contact portion, a vertical portion perpendicular to the middle portion, and a straight portion perpendicular to the vertical portion, the signal terminal further including a base part and a transition portion between the straight portion and the base part, the contact portion being U-shaped and including a first bending portion and a second bending portion;

a cable connected with the plurality of conductive terminals; and a metal shell disposed outside the insulating body, the metal shell including an annular portion with a receiving space, the annular portion including a top wall, the top wall having an opening with two opposite widthwise sides and two opposite lengthwise sides and two dug holes communicating with the opening, the conductive terminals being partially and directly below the opening and the dug holes and spaced apart from the opening and the dug holes in an up-down direction, the top wall further being provided with elastic pieces protruding inward from the opening to electrically connect with the ground terminal; wherein the width of the straight portion of the signal terminal is defined as L, one end of the widthwise side of the opening is set between L/2 outside the straight portion of one signal terminal and L/2 inside the straight portion of the one signal terminal while the other end of the widthwise side of the opening is set between L/2 outside the straight portion of the other signal terminal and L/2 inside the straight portion of the other signal terminal, and one end of the lengthwise side of the opening is set between the first bending portion and the second bending portion while the other end of the lengthwise side of the opening is set between a connection point of the straight portion and the transition portion and a widest point of the base part.

2. The electrical connector as claimed in claim 1, wherein the widthwise side is arranged axially symmetrically with respect to the center line of the ground terminal.

3. The electrical connector as claimed in claim 1, wherein a distance between the two signal terminals is varied from the contact portion to the base part.

4. The electrical connector as claimed in claim 3, wherein the vertical portion of the signal terminal further comprises a widened portion, and a distance between the two signal terminals from the contact portion to the widened portion close to the middle portion is smaller than a distance between the two signal terminals at the widened portion close to the straight portion to the base part.

5. The electrical connector as claimed in claim 1, wherein, in a direction perpendicular to the top wall, the dug hole overlaps with at least a part of the base part of a corresponding signal terminal.

6. The electrical connector as claimed in claim 1, wherein the insulating body comprises a first holder and a second holder stacked up and down together, the conductive terminals are disposed between the first holder and the second holder, the second holder is disposed between the top wall and the conductive terminals, the second holder comprises two first portions and one second portion, the second portion is disposed above the two first portions and connects two first portions, the second portion fills the opening and is shaped to conform to the shape of the opening, and the elastic pieces extend through the second portion and are electrically connected to the ground terminal.

7. The electrical connector as claimed in claim 1, wherein the width of the ground terminal is greater than that of the signal terminal.

8. The electrical connector as claimed in claim 1, wherein the annular portion comprises a front wall, a rear wall, and two side walls, the rear wall has a gap, and the conductive terminal, the first holder, and the second holder extend out through the gap.

9. The electrical connector as claimed in claim 1, wherein each widthwise side of the opening is provided with one elastic piece.

* * * * *